May 7, 1957   H. M. B. RÉCOPÉ DE TILLY BLARU   2,791,620
LIQUID DISTRIBUTING DEVICE FOR ACTIVATING
ELECTRIC BATTERIES
Filed Oct. 22, 1954   3 Sheets-Sheet 2
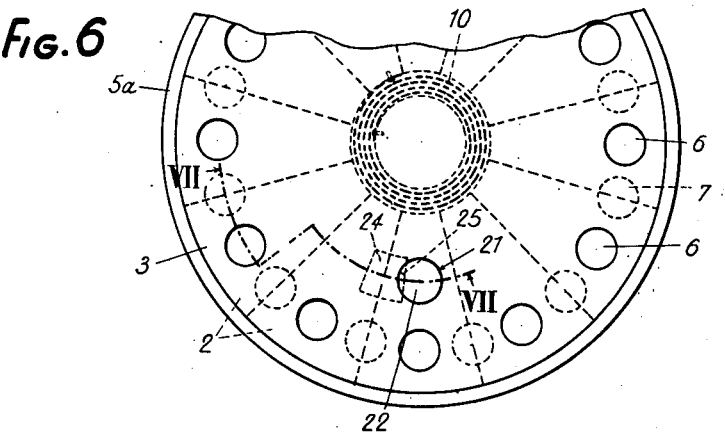
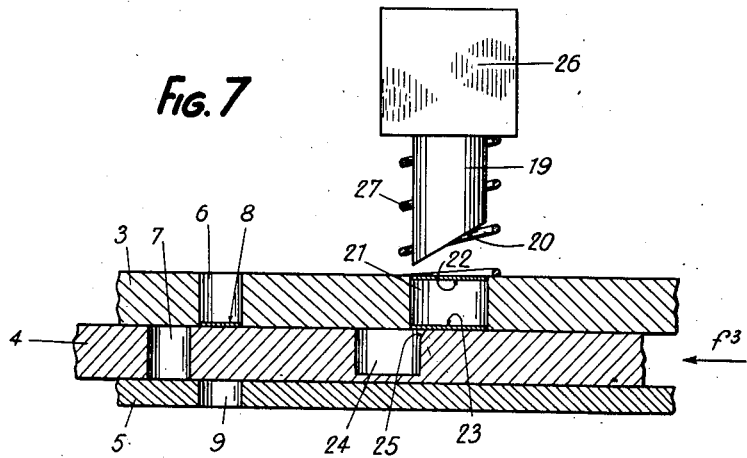
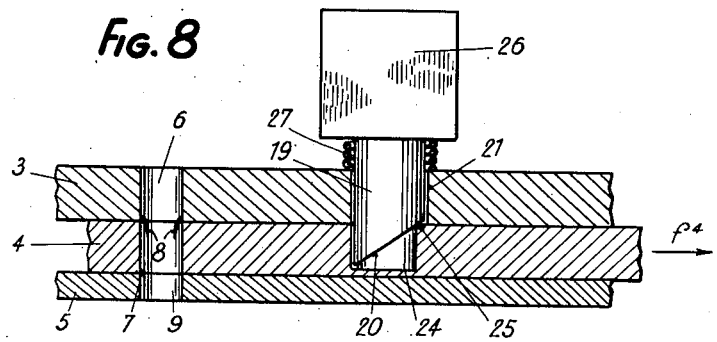
INVENTOR
HUBERT MARIE BERNARD RÉCOPÉ DE TILLY BLARU

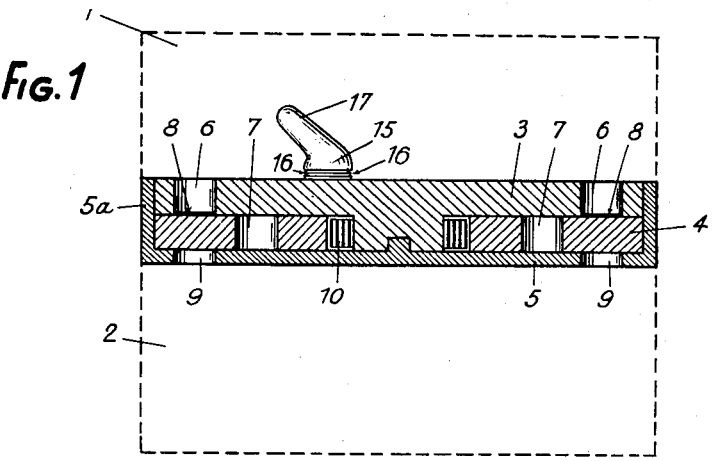
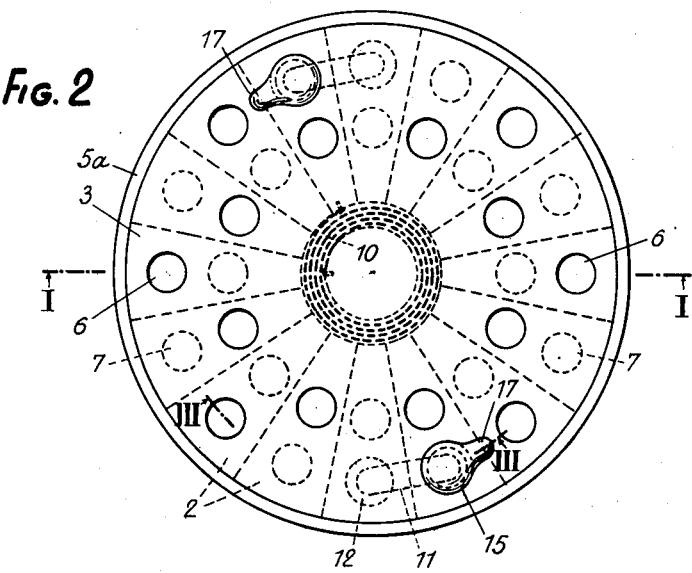
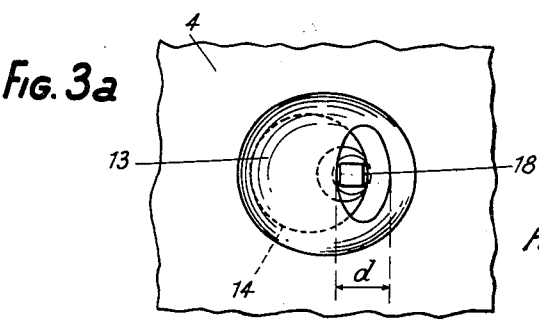

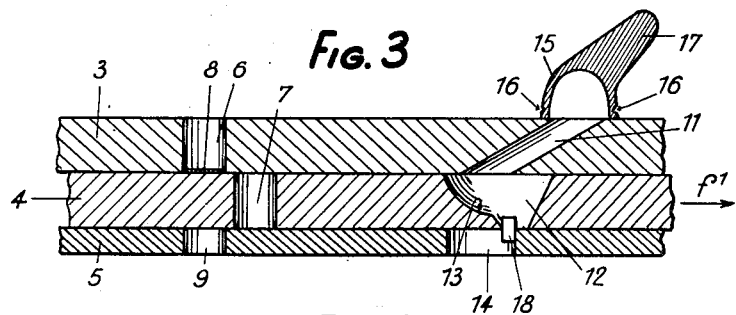
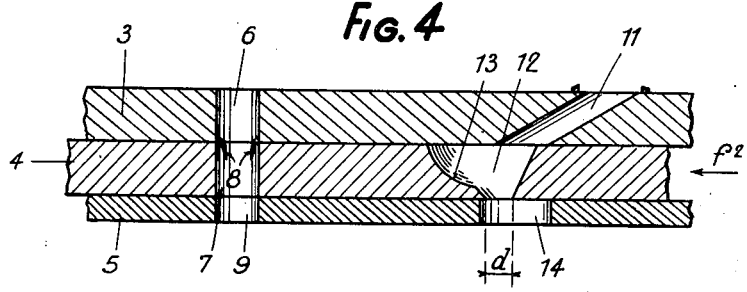
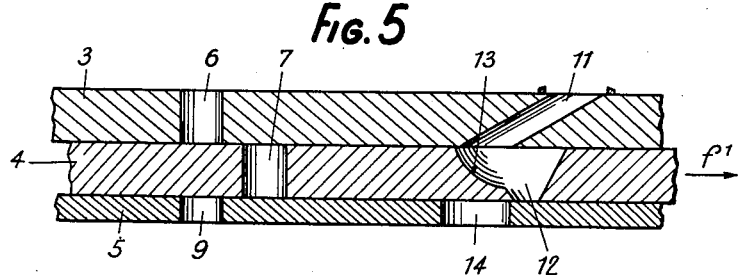
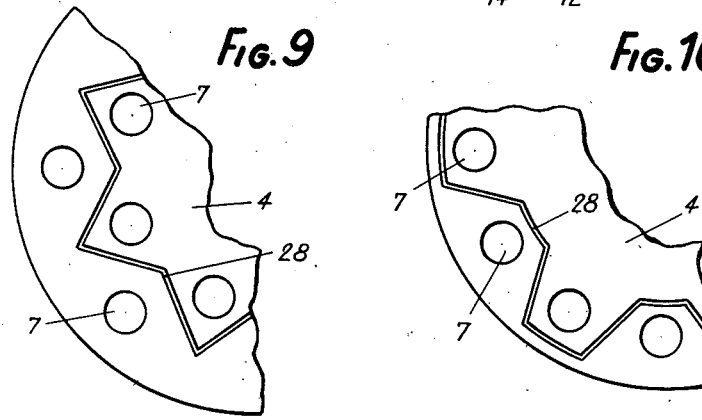

United States Patent Office 2,791,620
Patented May 7, 1957

2,791,620

LIQUID DISTRIBUTING DEVICE FOR ACTIVATING ELECTRIC BATTERIES

Hubert Marie Bernard Récopé de Tilly Blaru, Paris, France

Application October 22, 1954, Serial No. 464,029

Claims priority, application France October 28, 1953

17 Claims. (Cl. 136—90)

The present invention relates to a liquid distributing device for activating electric batteries from which the air has previously been exhausted. This liquid distributing device is characterized in that is comprises two plates formed with apertures and applied one upon the other in such manner that one of said plates can be displaced with respect to the other, the apertures of the first of said plates communicating with the cells of the battery to be activated, and the apertures of the second of said plates communicating with the liquid supply and being hermetically closed by thin membranes extending across said last-mentioned apertures, said plates being initially placed in such manner that the apertures of said first plate do not coincide with the apertures of said second plate, so that said membranes are supported by solid portions of said first plate, and means being provided for displacing one of said plates with respect to the other until the apertures of both said plates coincide, and for again displacing one of said plates with respect to the other until the apertures of said first plate do not coincide with the apertures of said second plate.

In this device the thin membranes, which are in themselves not strong enough for resisting to the pressure of the liquid, are in the position of rest relieved of any effort and insures a perfectly hermetic closure, but as soon as the apertures of both plates are brought into coincidence, said membranes are broken by the pressure of the liquid which is thus allowed to rush into the cells of the battery. In its final position, the device insures again the closure of the apertures of the cells, so that the latter are isolated from each other and the battery may be used in any position.

The means for displacing at least one of the plates may be of any kind. The plate may be displaced, for example, by hydraulical or mechanical means.

An embodiment provided with hydraulical means for displacing the plate may comprise at least one inclined passage formed in said second plate, said passage being normally closed by a removable closure member, while said first plate, which is movable, is formed in front of the outlet of each of said inclined passages with a vane-shaped opening exposed to the outlet of said passage and communicating with the subjacent cell of the battery. When the closure member of said inclined passage is removed, the jet of liquid traversing said passage towards said subadjacent cell impinges the wall of said vane-shaped opening and exerts thereupon a force which displaces said movable plate against the action of a return spring, until the apertures of both plates coincide with each other. As soon as the jet of liquid ceases, the return spring returns the movable plate to a position in which the apertures of the two plates do no more coincide with each other.

In a mechanical embodiment, the means for displacing the plate comprise at least one plunger adapted to be moved perpendicularly to the movable plate, each of said plungers having a wedge-shaped end cooperating with an edge of a corresponding recess formed in said plate.

According to another mechanical embodiment, the means for displacing the plate comprise an axially movable screw-threaded rod placed perpendicularly to said plate and cooperating with a nut rigid with said plate.

Other features of the invention will appear in the following specification and on the appended drawing which represents by way of example two embodiments of the invention.

Fig. 1 is an axial section of the first embodiment, on line I—I of Figure 2.

Fig. 2 is a corresponding plan view.

Fig. 3 is a partial section on a larger scale, on line III—III of Fig. 2, showing the device in its position of rest.

Fig. 3a is a plan view, at a still larger scale, showing a detail of Fig. 3.

Fig. 4 is a section similar to that of Fig. 3, but showing the device in the position in which the activating takes place.

Fig. 5 is another section similar to that of Fig. 3, but showing the device in its final position.

Fig. 6 is a plan view of the second embodiment.

Fig. 7 is a partial section, on a larger scale, on the broken line VII—VII of Fig. 6, showing the device in its position of rest.

Fig. 8 is a section similar to that of Fig. 7, but showing the device in the position in which the activating takes place.

Figs. 9 and 10 represent two embodiments of a detail.

Figs. 1 and 2 show schematically the reservoir 1 containing the activating liquid and the battery 2 to be activated, and it is understood that the air has been exhausted from the cells of said battery. The reservoir 1 is separated from the cells of the battery 2 by the liquid distributing device which comprises a fixed plate 3 and a movable plate 4 placed below said fixed plate. In this embodiment, the underside of the movable plate 4 is covered by another plate 5 having a flange 5a which surrounds the whole. The fixed plate 3 is formed with apertures 6, and the movable plate 4 is formed with apertures 7. The third plate 5 is formed with apertures 9 placed exactly below the apertures 6 of the fixed plate 3. A spring 10 urges the movable plate 4 towards its position of rest (Figs. 1 and 3), in which the apertures 7 do not coincide with the apertures 6 and 9.

The lower end of each aperture 6 is hermetically closed by a thin membrane 8 which is not strong enough for resisting to the pressure of the liquid contained in the reservoir 1, but in the position of rest (Figs. 1 and 3) each membrane 8 rests upon a solid portion of the subjacent plate 4. The membranes 8 are thus relieved of any effort and insure a hermetic closure as long as the device is in its position of rest.

The rotation of the movable plate 4 from its position of rest (Fig. 3) to the position in which the activation takes place (Fig. 4) is effected by hydraulic means which comprise one or more inclined passages 11 formed in the fixed plate 3 and, in front of the outlet of each of said inclined passages, an opening 12 with a vane-shaped wall 13 formed in the movable plate 4. In the embodiment as shown, two diametrally opposed means of this kind have been provided, but it is also possible to provide only one such means, or more than two, preferably equally distributed around the circumference of the device. The inlet of the passage 11 is closed by any convenient closure member which may be removed, for example by a cap 15 formed with a rupturing groove 16 and adapted to be broken by any convenient means, for example mechanically, or by the inertia of an eccentrically placed mass 17.

The movable plate 4 is arrested in its position of rest (Fig. 3), against the action of the spring 10 which urges said plate in the direction of the arrow $f^1$, by a small locking member 18 which is wedged between the edge of the outlet of the opening 12 formed in the plate 4, and the edge of the subjacent aperture 14 formed in the plate 5 (Figs. 3 and 3a).

When the cap 15 is broken, the liquid rushing from the reservoir 1 into the cell of the battery 2 which is located below the aperture 14 forms at the outlet of the inclined passage 11 a jet which impinges almost perpendicularly the vane surface 13 of the opening 12 and exerts upon the movable plate 4 a force which is directed as shown by the arrow $f^2$ (Fig. 4) and displaces said plate 4 until it reaches the position shown on Fig. 4, in which it is arrested by a stop (not shown). In this position, the apertures 7 are placed under the apertures 6, the membranes 8 are deprived of their support on the plate 4 and are broken, so that the liquid from the reservoir can rush through the apertures 6, 7 and 9 into the subjacent cells of the battery 2 to be activated. The locking members 18 are unwedged and drop into the subjacent cells of the battery.

When the cells of the battery 2 have been filled with liquid and the flow ceases in the passage 11, the return spring 10 acting in the direction of the arrow $f^1$ draws the movable plate 4 into the final position shown on Fig. 5, in which it is arrested by another stop (not shown) and all the apertures 9 and 14 are closed by the plate 4, so that the cells of the battery 2 are isolated from each other. Short-circuits between the cells are thus impossible and the battery can be used in any position.

As the passages 11, 12, 14 let the liquid pass before the apertures 6, 7, 9, and in order to ensure that all the cells of the battery 2 receive nevertheless equal quantities of liquid, the outlet of the opening 12 is given a width "$d$" (Fig. 4) which is smaller than that of the apertures 6, 7 and 9.

In the embodiment shown on Figs. 6 to 8, where the same references have been used for designating the same parts as in Figs. 1 to 5, the displacement of the movable plate 4 is obtained by mechanical means constituted by at least one plunger 19 which is movable perpendicularly to the plates and has a wedge-shaped end 20.

Under each plunger 19, the plate 3 is formed with a passage 21 which is hermetically closed at its upper and lower ends by membranes 22, 23. In the movable plate 4 is formed a recess 24 which presents a slightly chamfered edge 25 lying on the path of the leading edge of the wedge-shaped plunger end 20. A return spring 27 maintains the plunger in its position of rest (Fig. 7).

When the plunger 19 is forced down into the position shown on Fig. 8, for example by the inertia of a mass 26, which becomes effective when the whole device is submitted to an upward acceleration, the wedge-shaped end 20 of the plunger first breaks through the membranes 22, 23 and then acts upon the edge 25 of the recess 24, thus exerting upon the plate 4 a force directed as indicated by the arrow $f^4$ and displacing said plate until it reaches the position shown on Fig. 8, in which the apertures 6, 7, 9 coincide, the membranes 8 are broken and the cells of the battery 2 are supplied with liquid, as in the embodiment of Figs. 1 to 5. As soon as the force which lowers the plunger 19 ceases, the spring 27 raises said plunger again and the return spring 10, which acts in this case in the direction indicated by the arrow $f^3$, returns the plate 4 to the position shown on Fig. 7, in which all the cells of the battery are isolated from each other so that no short-circuit can occur and the battery may be used in any position.

According to another mechanical embodiment, the movement of the plate 4 may be controlled by a screw-threaded rod placed axially of the device and cooperating with a nut rigid with the movable plate 4, an axial displacement of this rod in one or the other direction causing a rotation of the movable plate 4 in one or the other direction.

In order to prevent short-circuits between the cells of the battery 2 through a film of electrolyte remaining between the plates of the device, the surface of one of these plates may be formed between its apertures with a groove 28 (Figs. 9 and 10) which is filled with a substance (for example a grease) having a coefficient of capillarity very different from that of the electrolyte.

Although the embodiments which have been described and shown comprise three superimposed plates, it is clear that two plates are sufficient to form the device according to the invention.

On the other hand, the movable plate can be the upper plate, instead of being placed below a fixed plate.

According to another feature of the invention, the surface of the plate which is the nearest to the liquid supply may not be plane. The surface of this plate may be formed with ribs, projections, grooves or recesses of any convenient shape for directing the liquid towards the apertures through which it is fed into the cells of the battery to be activated.

It will be understood that the invention is not limited to the embodiments which have been described and shown, but covers also any other embodiments based upon the same principles, within the scope of the appended claims. The device according to the invention may also be applied for activating storage batteries.

I claim:

1. A liquid distributing device for activating electric batteries from which the air has previously been exhausted, comprising two plates the first of which is adapted to be placed adjacent a battery to be activated and the second of which is adapted to be placed adjacent a liquid supply, said plates being formed with apertures and placed one upon the other in such manner that one of said plates can be displaced with respect to the other, said first plate having solid portions between said apertures of said first plate, a thin membrane extending across and hermetically closing each of said apertures of said second plate, said plates being normally positioned with the apertures of said first plate out of registration with the apertures of said second plate so that said solid portions of said first plate underlie said membranes, and means for displacing one of said plates with respect to the other until said apertures of both plates are in registration and for again displacing one of said plates until the apertures of said first plate are again out of registration with said apertures of said second plate.

2. A liquid distributing device as claimed in claim 1, in which said means comprise at least one inclined passage formed in said second plate, a removable closure member closing said inclined passage, and a vane-shaped opening formed in said first plate in front of the outlet of each of said inclined passages and communicating with the subjacent cell of the battery adjacent which said first plate is placed.

3. A liquid distributing device as claimed in claim 1, in which said means comprise at least one inclined passage formed in said second plate, a removable closure member closing said inclined passage, a vane-shaped opening formed in said first plate in front of the outlet of each of said inclined passages and communicating with the subjacent cell of the battery adjacent which said first plate is placed, a return spring acting upon said first plate, and a locking member detachably wedged in the outlet of said vane-shaped opening.

4. A liquid distributing device as claimed in claim 1, in which said means comprise at least one inclined passage formed in said second plate, a removable closure member closing said inclined passage, and a vane-shaped opening formed in said first plate in front of the outlet of each of said inclined passages and communicating with the subjacent cell of the battery adjacent which said first plate is placed, the section of the outlet of said vane-shaped opening being smaller than the section of said apertures.

5. A liquid distributing device as claimed in claim 1, in which said means comprise at least one plunger adapted to be displaced perpendicularly to said plates and having a wedge-shaped end, and one of said plates being formed with at least one recess, each of said recesses facing one of said plungers and having an edge lying in the path of the wedge shaped end of said plunger.

6. A liquid distributing device as claimed in claim 1, in which said means comprise at least one plunger adapted to be displaced perpendicularly to said plates and having a wedge-shaped end, said second plate being formed with passages in front of said plungers, at least one membrane hermetically closing each of said passages, and said first plate being formed with at least one recess, each of said recesses facing one of said plungers and having an edge lying in the path of the wedge shaped end of said plunger.

7. A liquid distributing device as claimed in claim 1, wherein said means comprise an axially movable screw-threaded rod placed perpendicularly to said plates and a nut engaging said rod and rigid with one of said plates.

8. A liquid distributing device as claimed in claim 1, wherein the surface of said second plate is formed with means for directing the liquid towards said apertures in said second plate.

9. A liquid distributing device as claimed in claim 1, wherein a groove is formed in the contact surface of at least one of said plates, between said apertures of said plate, said groove being filled with a substance having a coefficient of capillarity very different from that of said liquid.

10. A liquid distributing device for supplying an electrolyte to the cells of an electric battery comprising a pair of plates juxtaposed one upon the other, said plates each having apertures therethrough normally out of registry with one another, means for moving said plates relative to one another to bring said apertures in registry and means returning said plates to their normal out-of-registry position, a rupturable membrane extending across each aperture of one of said plates hermetically sealing each aperture, each membrane engaging the contacting surface of the other of said plates in the normal position of said plates prohibiting rupture thereof.

11. In combination with an electric battery and a liquid electrolyte supply reservoir for said battery, a liquid distributing device interposed between said battery and said reservoir, said distributing device comprising first and second plates placed one upon the other, each of said plates having apertures therethrough normally out of registry with one another, the apertures in said first plate communicating with said supply reservoir and the apertures of said second plate communicating with said battery and means for moving said plates relative to one another for bringing said apertures into registry and thereby communicating the electrolyte in said reservoir with said battery, a thin membrane extending across and hermetically closing each aperture of said first plate, each membrane resting normally against the adjacent solid surface of said second plate, the pressure of the electrolyte from said supply reservoir rupturing the membranes as said plate apertures are moved into registry with one another.

12. The combination of claim 11 wherein said means for relatively moving said plates comprises said first plate having at least one inclined passage therethrough, said second plate having a vane shaped opening normally in registry therewith for displacing said plates relative to one another and moving said plate apertures toward registry upon passage of liquid from said supply reservoir through said inclined passage, means normally closing liquid passage from said reservoir to said inclined passage.

13. The combination of claim 11 including resilient means returning said plates to a position of non-registry of said apertures in response to the cessation of liquid flow from said reservoir to said battery.

14. The combination of claim 11 wherein said means for relatively moving said plates comprises said first plate having at least one inclined passage therethrough, said second plate having a vane shaped opening normally in registry therewith for displacing said plates relative to one another and moving said plate apertures toward registry upon passage of liquid from said supply reservoir through said inclined passage, means normally closing liquid passage from said reservoir to said inclined passage, each of said second plate apertures and said vane opening communicating with a separate cell of said battery, the outlet area of said vane opening being smaller than the outlet area of each of said apertures of said second plate.

15. The combination of claim 11 wherein said means for relatively moving said plates includes a plunger having a wedge shaped end, said plunger being disposed for reciprocal movement through an aperture in one of said plates, the other of said plates having a recess therein into which the wedge shaped end of said plunger projects, said other of said plates having an edge defining said recess lying in the path of said wedge shaped end.

16. The combination of claim 11 wherein said means for relatively moving said plates comprises a screw threaded rod axially movable relative to said plates and extending perpendicularly to said plates, a nut rigidly attached to one of said plates engaging said rod.

17. The combination of claim 11 wherein the surface of at least one of said plates contacting the other plate has a groove formed therein between the apertures thereof, a substance filling said groove having a capillarity different from that of the battery electrolyte.

References Cited in the file of this patent

UNITED STATES PATENTS

| | | |
|---|---|---|
| 1,301,780 | Lotsch | Apr. 22, 1919 |
| 1,506,172 | Fredette | Aug. 26, 1924 |

FOREIGN PATENTS

| | | |
|---|---|---|
| 123 | England | Jan. 2, 1914 |